United States Patent

Tellier et al.

[11] Patent Number: 5,171,088
[45] Date of Patent: Dec. 15, 1992

[54] LIGHTING EQUIPMENT

[75] Inventors: Daniel Tellier, Guyancourt; Philippe Starck, Montfort-l'Amaury, both of France

[73] Assignee: JC Decaux, Neuilly, France

[21] Appl. No.: 707,127

[22] Filed: May 31, 1991

[30] Foreign Application Priority Data

Jun. 1, 1990 [FR] France .............................. 90 06882

[51] Int. Cl.[5] .............................................. B60Q 1/06
[52] U.S. Cl. .................... 362/428; 362/233; 362/386; 362/431
[58] Field of Search ............... 362/233, 285, 286, 287, 362/386, 413, 427, 428, 431

[56] References Cited

U.S. PATENT DOCUMENTS

| 473,229 | 4/1892 | Kim | 362/431 X |
|---|---|---|---|
| 1,781,372 | 6/1929 | Denecke | 362/427 X |
| 3,949,218 | 4/1975 | Hayward | 362/233 |

FOREIGN PATENT DOCUMENTS

| 2319877 | 4/1972 | Fed. Rep. of Germany . |
| 3310213 | 3/1983 | Fed. Rep. of Germany . |
| 1365409 | 5/1963 | France . |
| 624178 | 6/1946 | United Kingdom . |

Primary Examiner—Stephen F. Husar
Attorney, Agent, or Firm—Wegner, Cantor, Mueller & Player

[57] ABSTRACT

Lighting equipment, in particular a street lamp comprising a post extended at the upper end by at least one transverse arm to the free end of which is fixed a luminaire. To enable the streetlighting to be varied and to facilitate maintenance of the luminaires, the arm is pivoted to the post and the street lamp incorporates an actuator device for rotating the arm about its pivot axis in order to deploy it to a greater or lesser extent. The actuator device includes struts and a lead screw type actuator driven by an electric motor housed inside the hollow post.

5 Claims, 3 Drawing Sheets

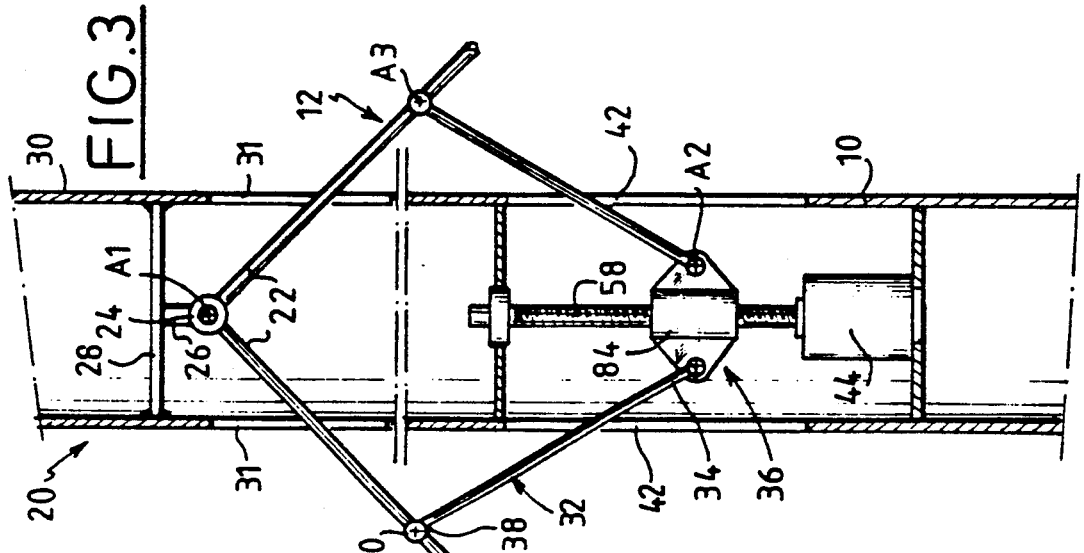
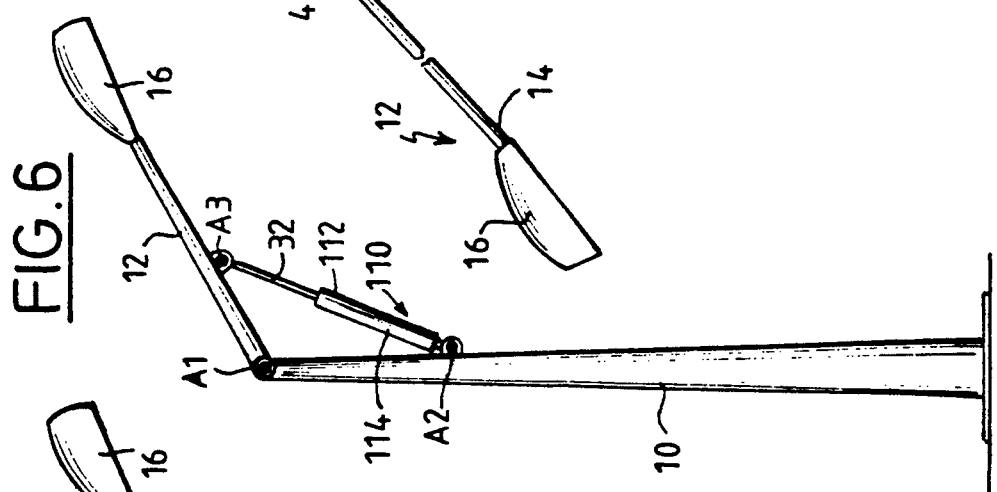
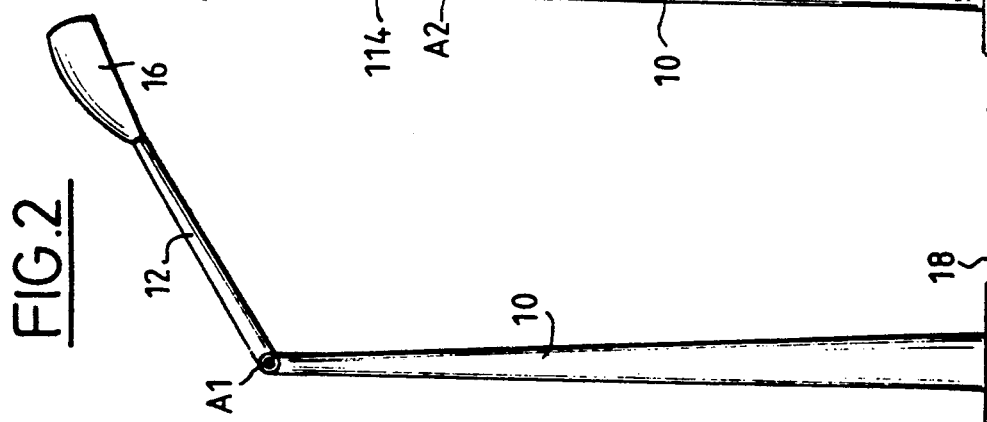
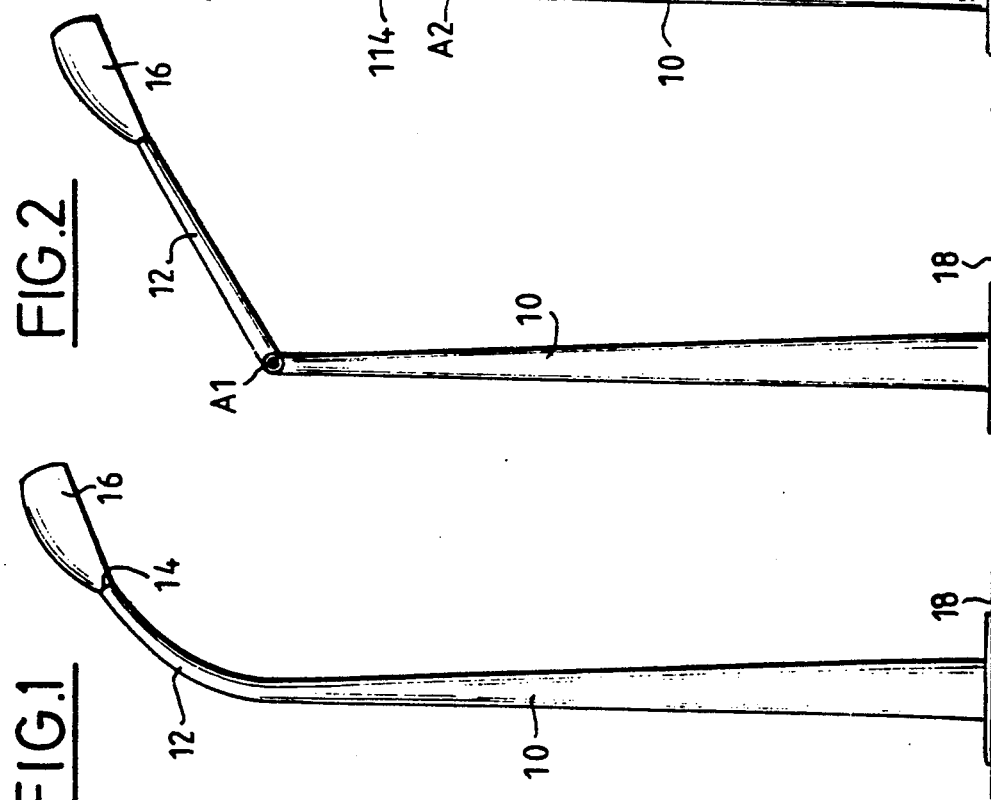

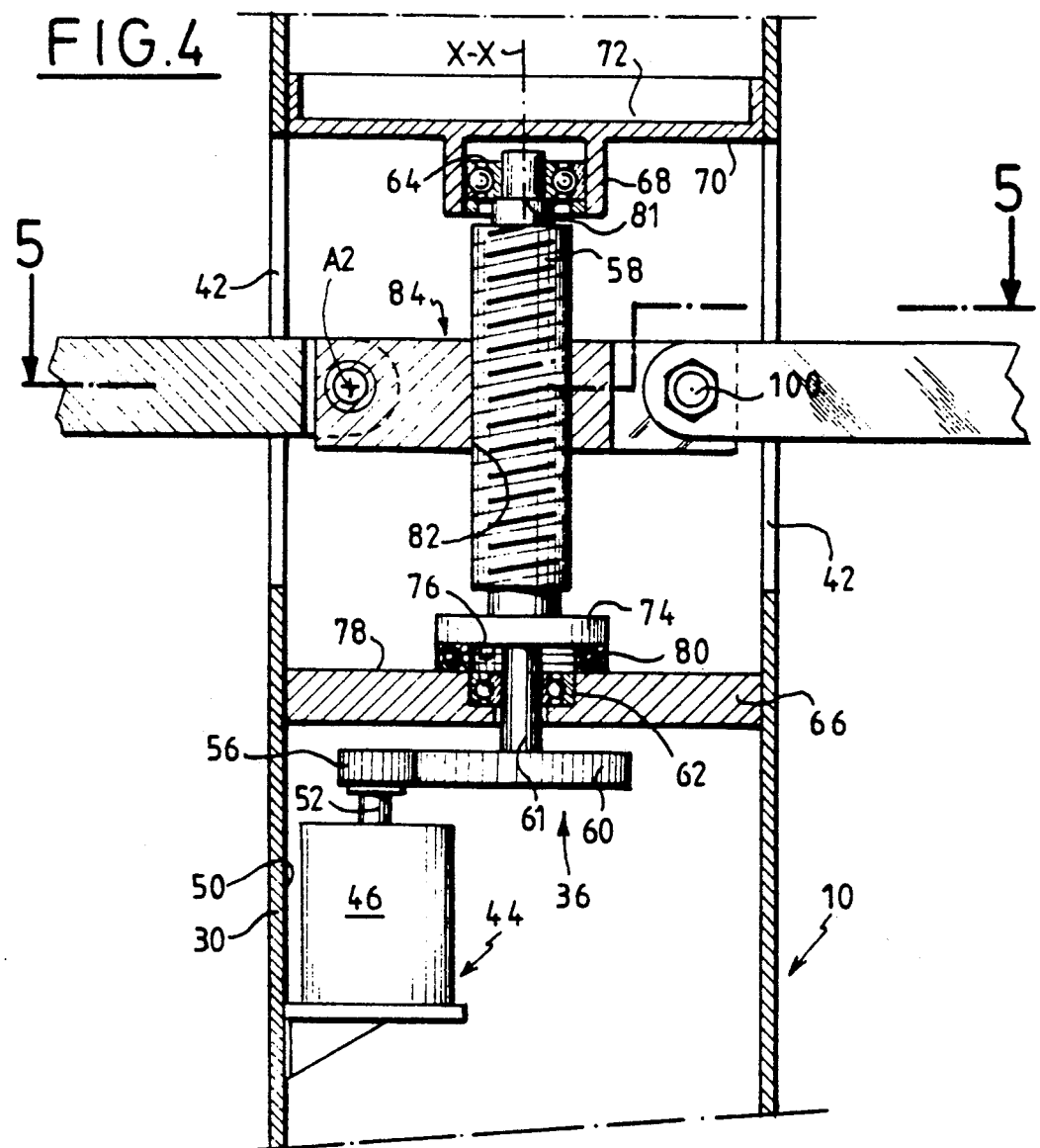
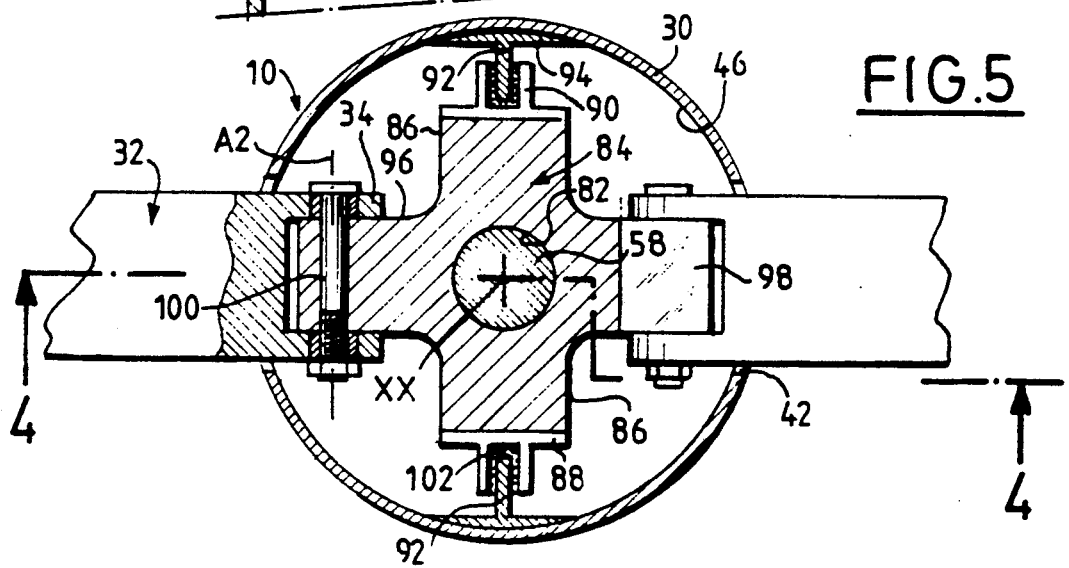

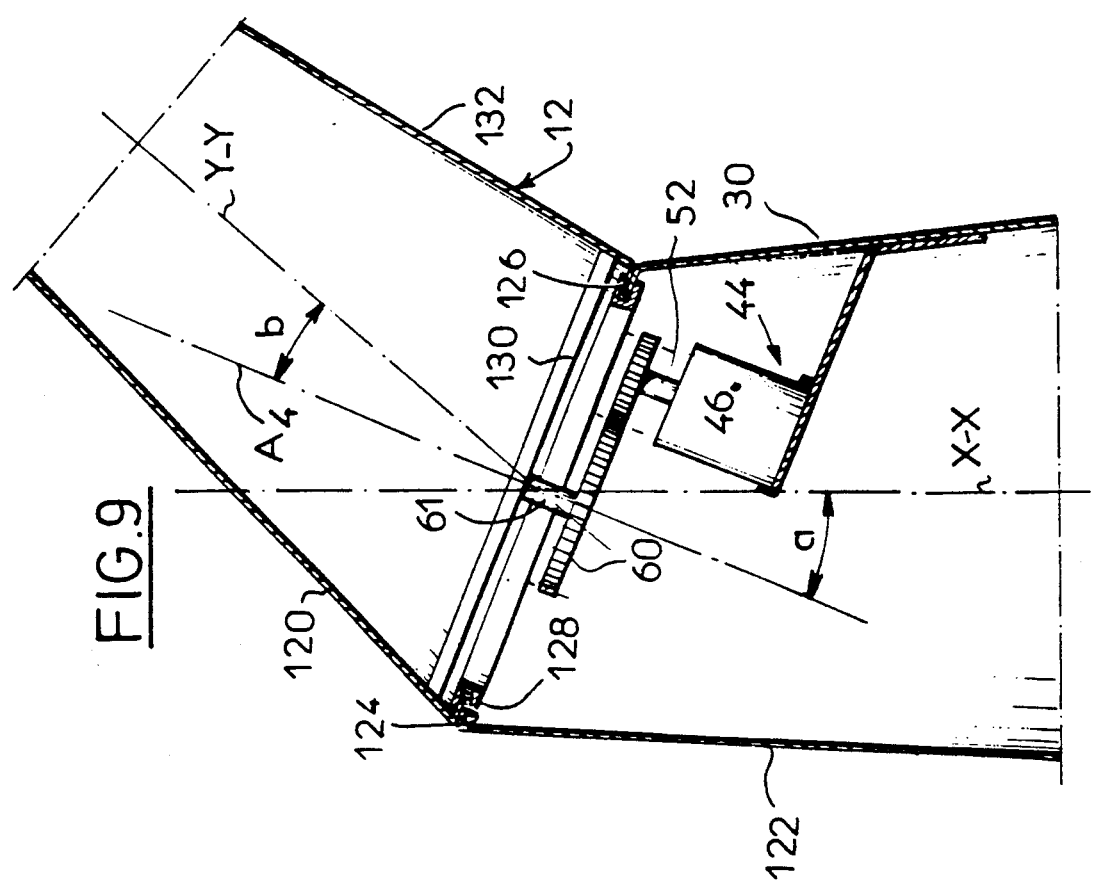
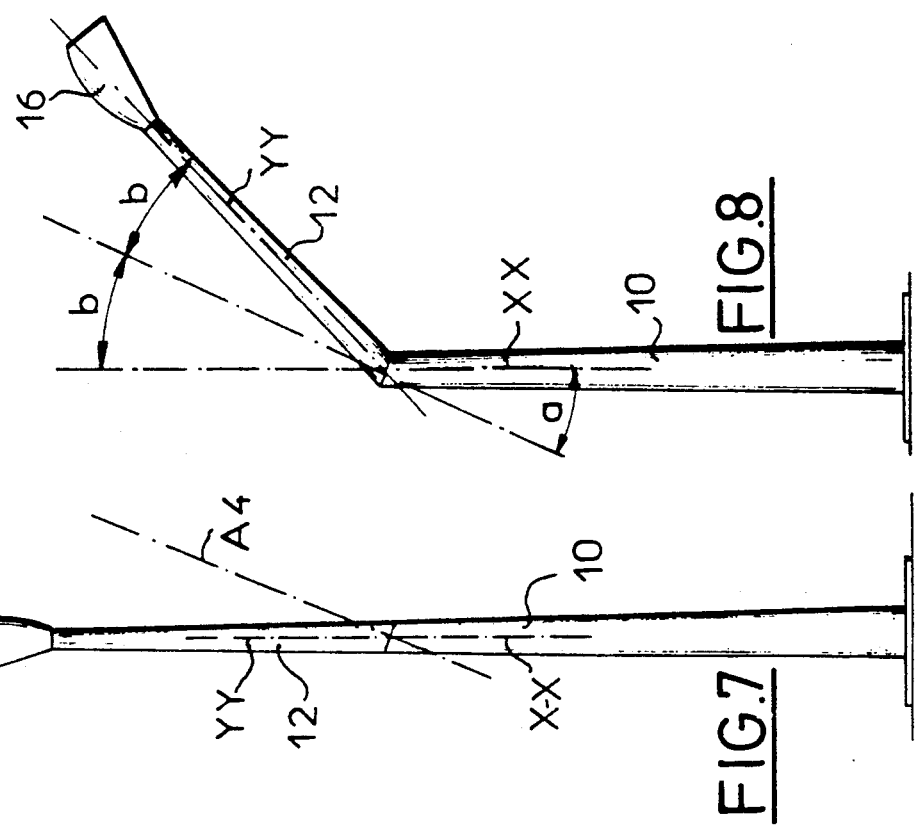
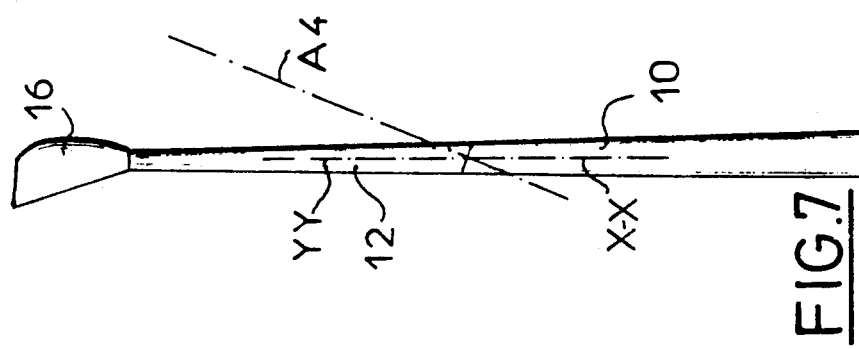

5,171,088

LIGHTING EQUIPMENT

BACKGROUND OF THE INVENTION

1. Field of the Invention

The present invention concerns lighting equipment.

The invention is more particularly concerned with streetlamps comprising a substantially vertical post extended at the upper end by at least one transverse arm or crossmember at the free end of which is a lighting device.

Lighting equipment of this type, i.e. streetlamps, is usually manufactured in one piece, the lighting device of luminaire being articulated to the free end of the arm.

An object of the present invention is to propose lighting equipment of the above mentioned type which enables the street lighting conditions be varied at will by modifying the position in space, and in particular the height, of the luminaire of the street lamp, and facilitates maintenance and lamp replacement.

2. Summary of the Invention

The invention consists in lighting equipment, in particular streetlighting equipment, comprising a substantially vertical post extended at its upper end by at least one transverse arm to the free end of which a lighting device is fixed, said arm being pivoted to said post and said equipment comprising a device for rotating said arm about its pivot axis.

Subsidiary features of the invention include:

an arm support strut of which a first end is connected to said actuator device and the second end is pivoted to said arm about an axis parallel to the axis about which said arm is pivoted to said post, said two axes being substantially horizontal.

said actuator device is a jack.

said post is hollow and said jack comprises a lead screw disposed inside said post in a direction parallel to the longitudinal axis of said post and receiving a nut guided to slide axially within said post, and the wall of said post incorporates a longitudinal aperture through which said strut passes, said first end of said strut being articulated to said nut about a pivot axis parallel to said other two pivot axes.

said nut comprises at least one radial guide arm the free end of which comprises a device for guiding sliding movement inside said post.

the free end of said radial guide arm is bifurcate with two branches between which is received a longitudinal guide rail fixed to the inside surface of the wall of said hollow post.

said nut comprises at least one radial drive arm perpendicular to said radial guide arm and to the free end of which is pivoted said first end of said strut.

the equipment comprises two opposed transverse arms and said nut comprises two identical and diametrally opposed radial guide arms and two identical and diametrally opposed radial drive arms at the free ends of which are fixed said first ends of said struts of each of said two arms.

said screw of said actuator is rotated by an electric motor fixed inside said post.

said first end of said strut is an axial extension of the piston rod of a hydraulic ram the cylinder of which is pivoted to said post about a pivot axis parallel to said other two pivot axes.

In another aspect the invention consists in a streetlighting installation comprising a plurality of lighting equipments in accordance with the invention as defined above and means for command simultaneously the devices for actuating the various lighting equipments.

Other characteristics and advantages of the invention will emerge from the following detailed description given by way of non-limiting way of example only with reference to the appended diagrammatic drawings.

BRIEF DESCRIPTION OF THE DRAWINGS

FIG. 1 is a schematic view of a prior art street lamp.

FIG. 2 is a schematic view showing the general principle of a street lamp in accordance with the invention.

FIG. 3 is a schematic view in axial longitudinal cross-section of the upper part of a twin-arm street lamp in accordance with the invention.

FIG. 4 is a view in axial longitudinal cross-section on the line 4—4 in FIG. 5 of the post of the street lamp showing the arm of the deployment actuator device.

FIG. 5 is a view in cross-section on the line 5—5 in FIG. 4.

FIG. 6 is a diagram showing an alternative embodiment of articulated arm street lamp.

FIGS. 7 and 8 are two diagrams showing another embodiment of a streetlamp in accordance with the invention.

FIG. 9 is view similar to that of FIG. 4 showing the arm articulation and rotary drive means.

DETAILED DESCRIPTION OF THE INVENTION

FIG. 1 shows a street lamp comprising a first part in the form of a vertical post 10 extended in its upper part by an inclined transverse arm 12.

The free end 14 of the transverse arm 12 carries a luminaire 16 which may be articulated to this free end.

This type of street lamp is fixed and rigid and makes no provision for varying the lighting of the ground 18 or of maintaining the luminaire 16 other than by means of a cherry-picker or a tall ladder.

FIG. 2 shows the design principle of a street lamp in accordance with the invention.

The transverse arm 12 is articulated to the vertical post 10 about a first horizontal articulation geometric axis A1. The street lamp incorporates a device for actuating or pivoting the arm 12 about its axis A1 (not shown) to vary the position in space of the luminaire 16 and in particular its height relative to the roadway 18.

In the embodiment shown in FIGS. 3 through 5 the post 10 is hollow with a substantially cylindrical cross-section to the upper part (20) of which are articulated two arms 12.

Each arm 12 is articulated near its end 22 opposite its free end 14 about a common horizontal geometric axis A1 inside the hollow post 10.

The ends 22 may be articulated in the conventional way, for example, by a yoke mounting on a shaft 24 which is fixed to the upper end of a foot 26 welded to the upper surface of disk-shape horizontal plate 28 welded to the interior of the post.

The wall 30 of the post comprises two opposed longitudinal axial slits 31 through which the arms 12 pass and whose axial dimension depends on the angle through which the arm 12 is to pivot.

Each arm 12 is fitted with a support and actuator strut 32.

The two first ends 34 of the struts 32 are pivoted to the latter about pivot geometric axes A2 which are parallel to the first pivot axis A1.

The second end 38 of the struts 32 are connected to the arms 12 to which they are fixed by pivot devices 40, such as yoke type mountings, for example, the geometric axes A3 of which are parallel to the second axes A2 and to the first axis A1.

The wall 30 of the post 10 includes a second pair of opposed axial longitudinal slits 42 through which the struts 32 pass and in which they pivot.

A preferred embodiment of the drive device 36 as shown in FIGS. 4 and 5 will now be described.

The device 36 is a screwjack driven by an electric motor-brake 44 the stator 46 of which is fixed to the inside of the post 10 by means of an angle-iron 48 welded to the inside surface 50 of the post 10.

The shaft 52 of the motor 44 carries a drive gear 56 which drives the lead screw 58 through a toothed ring 60 fixed to the lower end 52 of the screw.

The screw 58 rotates about its axis which is coaxial with the longitudinal axis X—X of the post 30, being guided by a bottom bearing 62 and a top bearing 64.

The bottom bearing 62 is mounted in an internal radial plate 66 welded into the post 30 and the top bearing 64 is mounted in a bush 68 which extends axially from the lower surface 70 of another internal radial plate 72 welded into the post 30. The body of the screw 58 is provided on its lower surface with a radial shoulder 74 the lower surface 76 of which bears axially on the upper surface 78 of the lower plate 66 through a ball thrust bearing 80.

The body of the screw 58 is prevented from moving axially in translation by an upper shoulder B1 which bears on the inner ring of the top bearing 64.

The external screwthread on the screw 58 cooperates with the internal screwthread 82 of a nut 84.

The nut has two diametrically opposed radial guide arms 86. The free end 88 of each of the radial arms 86 comprises a forked guide slide member the parallel branches 90 of which slidably receive a guide rail 92 the base 94 of which is fixed to the inside surface 46 of the post 10.

The rails 92 are parallel to the axis X—X of the screw 58 and the post 10 and simultaneously prevent the nut 84 rotating about its axis and guide it as it slides axially within the post 10.

The nut 84 includes two diametrically opposed radial drive arms 96 at right angles to the guide arms 86.

The free end 98 of each radial drive arm 96 receives the first end 34 of the strut 32 which is pivoted about its geometric axis A2 by means of a conventional yoke mounting with a shouldered shaft 100.

Supplying the motor 46 with electrical energy rotates the screw 58 in one direction or the other and so moves the nut 84 in translation axially up or down.

The sliding motion of the nut 84 is facilitated by the provision of PTFE skids 102 between the branches 90 and the rails 102.

The movement of the nut 84 in translation causes simultaneous vertical displacement of the first ends 34 of the struts 32 and therefore pivoting of the arms 12 about their pivot axis A1 due to the action of the support struts 32 which serve as actuator levers.

In the embodiment schematically shown in FIG. 6 the actuator device is a piston-and-cylinder actuator 110 the cylinder 112 of which is pivoted at its lower end directly to the post 10 about a geometric axis A2 and the piston rod of which may be the strut 32.

The actuator 110 is hydraulic ram, for example, which is operated to lengthen or shorten the distance between the axes A2 and A3 and so pivot the arm 12 about the axis A1.

The arm 12 may be held in a particular angular position by maintaining the pressure within the control chamber 114 of the actuator 110, for example.

The embodiment shown in FIGS. 7 through 9 will now be described.

The pivot axis A4 of the articulated arm 12 is at a first acute angle a to the vertical longitudinal axis X—X of the post 10. The pivot axis A4 is also contained in a plane (the plane of the figures) containing the axis X—X of the post.

The longitudinal axis Y—Y of the arm 12 and in particular the longitudinal axis of the lower end 120 of the arm 12 which is pivoted to the free upper end 122 of the post 10 is at a second acute angle b to its pivot axis A4 on the post 10. The pivot axis A4 is also contained in a plane containing the axis Y—Y of the arm.

In a deployed position shown in FIG. 7 and 9, or in the stowed position of FIG. 8, the axes X—X, A4 and Y—Y are all coplanar.

In the preferred embodiment shown in the figures the acute angles and b are equal so that in the deployed position the axis Y—Y of the arm 12 is at an angle 2a to the vertical axis X—X of the post 10 and in the stowed position the axes X—X and Y—Y are conincident, the street lamp then resembling a continuous vertical post.

Referring to FIG. 9, note that the facing ends 120 and 122 of the arm 12 and the post 10 are coupled in rotation by means of respective inside radial edges 124 and 126 which are received in a U-shape cross-section internal bush 128.

The hollow post 10 encloses an electric motor 44, a toothed wheel transmission 56/60, the shaft 61 of the latter being coupled in rotation to an internal radial plate 130 welded to the interior of the hollow arm 12.

Supplying electrical power to the motor 44 rotates the arm 12 about the axis A4. The change from one of the positions shown in FIGS. 7 and 8 to the other is obtained by a rotation of one half-turn about the pivot axis A4.

The invention also provides public lighting installations (not shown) consisting of a plurality of articulated motorized arm streetlamps in accordance with the invention deployment of which is commanded simultaneously. By commanding the electric motors 44 or the hydraulic rams 110 simultaneously, for example, the arms of the different streetlamps pivot in perfect synchronism.

A centralized control unit may be implemented by means of a programmable automatic controller which causes an increasing or decreasing upward or downward movement of a row of streetlamps.

There is claimed:

1. Lighting equipment, in particular streetlighting equipment, comprising a substantially vertical post extended at its upper end by at least one transverse arm to the free end of which a lighting device is fixed, said arm being pivoted to said post and said equipment comprising a device for rotating said arm about its pivot axis, said pivot axis of said arm to said post being contained within a plane containing the longitudinal axis of said post and said two axes are at first angle to each other.

2. Lighting equipment according to claim 1 wherein the longitudinal axis of said pivoted arm is at a second angle to its pivot axis on said post.

3. Lighting equipment according to claim 2 wherein said first and second angles are equal.

4. Lighting equipment according to claim 1 wherein said device for rotating said arm about is pivot axis comprises a rotary motor.

5. Lighting equipment according to claim 1 wherein the lower end of said arm is pivoted to rotate at the free upper end of said post which is hollow, said drive motor being mounted inside said post, and said rotational guide device comprises a transmission between the output shaft of said motor and a drive shaft of said pivoted arm to which it is rotationally coupled.

* * * * *